(Model.)
3 Sheets—Sheet 1.
L. PRITZIUS.
APPARATUS FOR MOLDING CAOUTCHOUC PALATE PLATES FOR ARTIFICIAL TEETH.
No. 443,378.
Patented Dec. 23, 1890.
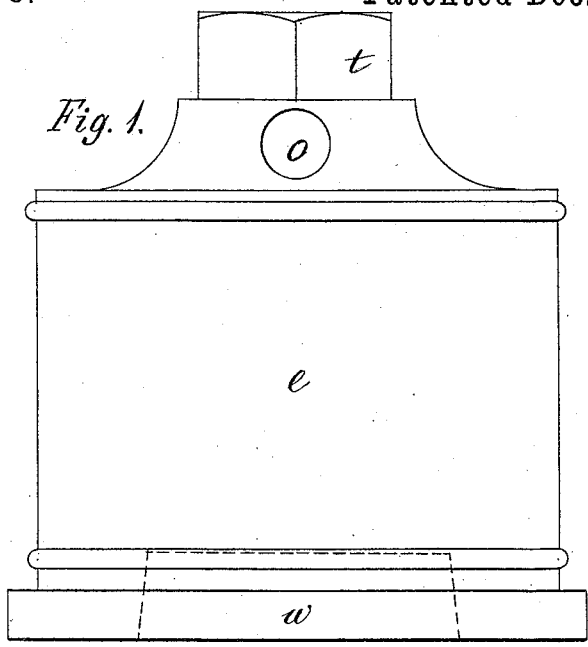
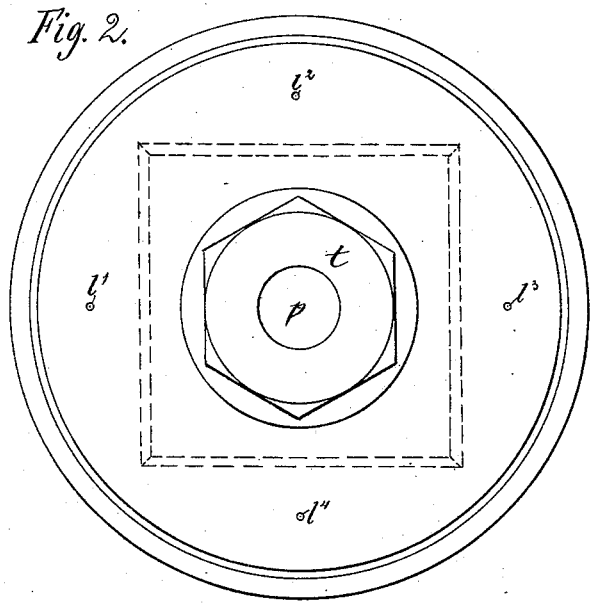

(Model.)

L. PRITZIUS.
APPARATUS FOR MOLDING CAOUTCHOUC PALATE PLATES FOR ARTIFICIAL TEETH.

No. 443,378. Patented Dec. 23, 1890.

Witnesses.
Inventor,
L. Pritzius
by Munn & Co.
Attorneys.

(Model.) 3 Sheets—Sheet 3.
L. PRITZIUS.
APPARATUS FOR MOLDING CAOUTCHOUC PALATE PLATES FOR ARTIFICIAL TEETH.
No. 443,378. Patented Dec. 23, 1890.
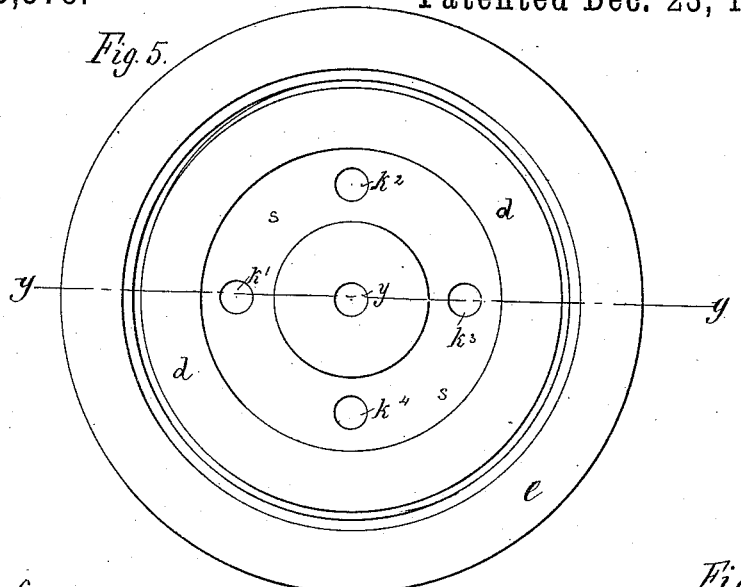
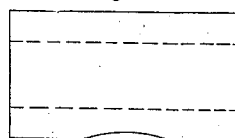
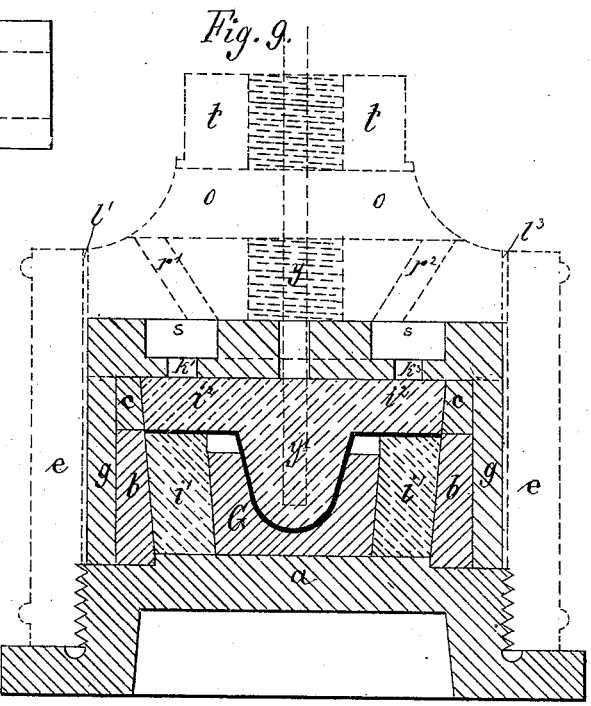
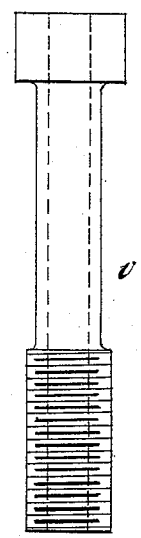
Witnesses.
C. Sedgwick
J. M. Ritter
Inventor
L. Pritzius
by Munn & Co
Attorneys.

UNITED STATES PATENT OFFICE.

LUDWIG PRITZIUS, OF LUDWIGSHAFEN-ON-THE-RHINE, GERMANY.

APPARATUS FOR MOLDING CAOUTCHOUC PALATE-PLATES FOR ARTIFICIAL TEETH.

SPECIFICATION forming part of Letters Patent No. 443,378, dated December 23, 1890.

Application filed January 2, 1890. Serial No. 335,642. (Model.)

*To all whom it may concern:*

Be it known that I, LUDWIG PRITZIUS, a subject of the King of Bavaria, residing at Ludwigshafen-on-the-Rhine, in the Kingdom of Bavaria, Germany, have invented new and useful Improvements in Apparatus for Molding Caoutchouc Palate-Plates for Artificial Teeth, of which the following is a specification.

This invention relates to the manufacture of caoutchouc palate-plates for artificial teeth; and its object is to provide a simple and efficient apparatus by means of which said plates may be accurately molded and rendered hard and dense, and which apparatus will be free from danger of explosion during the manufacture of the plates.

The invention consists in the construction, arrangement, and combination of parts, as hereinafter described and claimed.

Reference is to be had to the accompanying drawings, forming a part of this specification, in which similar letters of reference designate corresponding parts in the several views.

Figure 3:
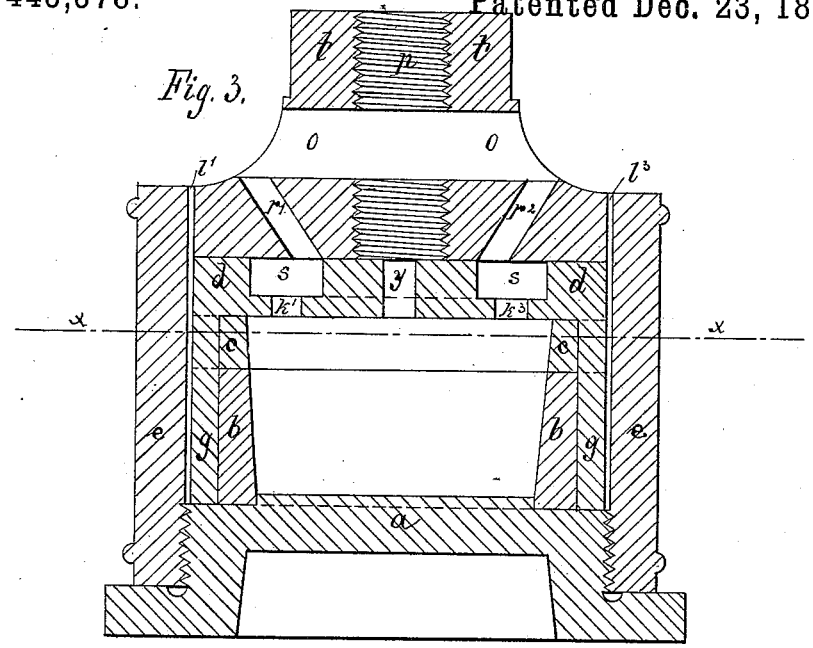
Figure 4:
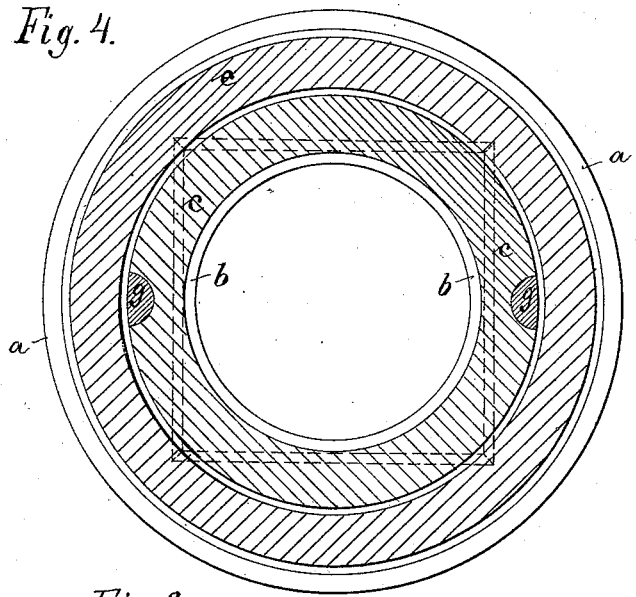
Figure 8:
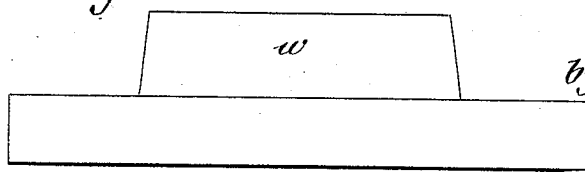

Figure 1 is an elevation of the apparatus. Fig. 2 is a plan view. Fig. 3 is a vertical section. Fig. 4 is a horizontal section on the line $xx$ in Fig. 3. Fig. 5 is a top view, the casing being removed. Figs. 6, 7, and 8 are detail views of parts hereinafter described; and Fig. 9 is a vertical section of the apparatus, showing the mold and plate in place and under pressure.

The apparatus is constructed of cast metal, its base-plate $a$ being cut away in rectangular shape centrally of its under face and formed with an annular flange by which it may be supported on a work-bench or table. Upon said base-plate, in an annular recess formed in its upper face, rests a ring $b$, upon which rests a second ring $c$, both rings having inwardly-inclined inner faces which are flush with each other when the rings are in place. In the outer faces of both rings are formed semicircular recesses to receive guide-rods $g$, semicircular in cross-section, depending from a cover $d$, hereinafter described, which rods when the cover is in place upon the upper ring prevent said rings from being turned.

The cover $d$ is of such diameter that its edge will rest flush with the outer face of the rings, and it is provided in its center with an opening $y$, for a purpose hereinafter explained, leading to the space inclosed by the cover, base-plate, and rings, and is formed in its upper face with an annular groove $s$, in which are provided openings $k'$, $k^2$, $k^3$, and $k^4$, also leading to said space. Surrounding the cover and rings and resting upon the flange of the base-plate is fitted a casing $e$, the inner face of the lower end of which is threaded and engages with similar threads upon the exterior of the base-plate. In the upper part of said casing are formed outwardly-inclined passages $r'$ and $r^2$, which communicate with the groove in the cover $d$. A head-piece $t$ is formed at the center of the upper part of said casing, which is provided with a horizontal opening $o$, adapted to receive a suitable lever for screwing down the casing, which opening communicates with the passages $r'$ and $r^2$ and with a central internally-threaded opening $p$, communicating with the central opening $y$ in the cover $d$, said latter opening being adapted to receive either the pressure-screw $u$ (shown in Fig. 6) or the threaded tube $v$. (Shown in Fig. 7.)

Outlet-passages $l'$, $l^2$, $l^3$, and $l^4$ are provided in the casing next the cover, guide-rods, and rings to allow air to pass out as the casing is screwed down upon the base-plate and cover.

To prevent the base-plate from turning as the casing is screwed down, the casting $w$, (shown in Fig. 8,) which has a projection on its upper face corresponding in shape to the cut-away portion of the base-plate, is secured to the work-bench or table in any suitable manner, and the base-plate is fitted thereon, as shown in Fig. 1.

In operation the base-plate $a$ is fitted upon the casting $w$, the casing, cover, and upper ring are removed, and a cast G, of gypsum, made in the usual manner from a wax impression of the mouth for which the palate-plate is intended and with the teeth to be supplied molded in wax in said cast, is placed on the base-plate in the lower ring $b$, and gypsum is poured around the same, as shown at $i'$ $i'$ in Fig. 9, and the upper surface of the gypsum and the cast is then treated in the usual manner to prevent the gypsum to be poured into the upper ring from adhering to it. The upper ring $c$ is then placed upon the ring $b$, and gypsum is poured into the same upon that in the lower ring, as shown at $i^2$ $i^2$ in Fig.

9, until the ring $c$ and cast G are filled, and an opening $y'$ is made in the center thereof, extending nearly to the opposing surface of the cast G, for a purpose hereinafter explained. The cover $d$ is then put in place, its opening $y$ registering with the opening $y'$, just referred to, and the casing $e$ is screwed to place upon the base-plate and cover by means of a lever applied to the horizontal opening $o$ in its head-piece, thus pressing the contents of the rings $b$ and $c$ together, the air confined between the casing, cover, and rings passing off through the openings $l'$, &c., in the casing, and any excess of gypsum finding exit through the openings $k'$, &c., in groove $s$ of the cover and the passages $r'$ $r^2$ in the head-piece of the casing. After the molds in the rings $b$ and $c$ have become set the casing, cover, the mold adhering to the cover, and the ring $c$ are removed, and the apparatus is disengaged from the casting $w$ and placed over any proper source of heat, and the base-plate and lower ring are raised in temperature sufficiently to melt the wax in said ring and permit of its extraction by a suitable tool. The upper ring, cover, and mold are then replaced, and the casing $e$ is screwed upon the base-plate. Heat is now applied to the base-plate, and as the temperature reaches 90° centigrade, ascertained by inserting a thermometer through the openings $y$ $y'$ in the cover and upper mold, the water in the gypsum is converted into steam and escapes through the openings in the cover and head-plate until at a temperature of 140° centigrade it ceases to escape, and the gypsum is then dry. Thereupon the casing is unscrewed from the base-plate, the ring $c$, cover $d$, and upper mold are removed, and the quantity of caoutchouc necessary to form the palate-plate is placed in the lower mold, which is still hot, and is rendered plastic thereby. The ring $c$, cover, and upper mold are then replaced and the casing $e$ is again screwed down to a contact with said cover, but not tightly upon the base-plate. The pressure-screw $u$ or the threaded tube $v$ is then applied to the vertical aperture in the head-piece of the casing and screwed down tightly upon the cover, binding the caoutchouc tightly between the molds in the upper and lower rings. The casing is then gradually screwed down tightly upon the base-plate, the screw $u$ or tube $v$ being at the same time gradually unscrewed. The caoutchouc plate may then be vulcanized by applying to the molds and base-plate heat to about 155° or 160° centigrade, the gases evolved passing out through the molds and the apertures in the cover and head-piece of the casing to the atmosphere. After about half an hour has elapsed the heat is cut off and the apparatus allowed to cool sufficiently to permit of removing the finished plate.

Having thus described my invention, what I claim, and desire to secure by Letters Patent, is—

1. An apparatus for molding caoutchouc palate-plates for artificial teeth, consisting of a base-plate $a$, having exterior threads, rings $b$ and $c$, resting one upon the other and supported by said base-plate, an apertured cover $d$, resting on the upper ring, and a casing $e$, having air and vapor outlets and provided with interior screw-threads fitting the threads on the base-plate, substantially as shown and described.

2. An apparatus for molding caoutchouc palate-plates for artificial teeth, consisting of a base-plate $a$, the rings $b$ and $c$, resting one upon the other and supported by said base-plate, the grooved and apertured cover $d$, resting on the ring $c$, and the casing $e$, secured to the base-plate and provided with the passages $l'$, $l^2$, $l^3$, and $l^4$, $r'$ and $r^2$, and with the head-piece $t$, having the horizontal opening $o$ and the vertical screw-threaded opening $p$, substantially as shown and described.

3. In an apparatus for molding caoutchouc palate-plates for artificial teeth, the combination, with the base-plate $a$ and the vertical recessed rings $b$ and $c$, of the cover $d$, provided with the rods $g$, fitting in the recesses of said rings, and the casing $e$, secured to the base-plate, substantially as shown and described.

In testimony whereof I have signed my name to this specification in the presence of two subscribing witnesses.

LUDWIG PRITZIUS.

Witnesses:
FRITZ GÜNTHER,
FRIEDRICH WEISS.